United States Patent [19]

Sasamoto et al.

[11] Patent Number: 5,109,502

[45] Date of Patent: Apr. 28, 1992

[54] HEAD EXCHANGE SYSTEM FOR DISC DRIVE SYSTEM CONTROLLING BUSY SIGNALS IN ACCORDANCE WITH HEAD OFFSET

[75] Inventors: Tatsuro Sasamoto, Tama; Masamichi Suzuki, Kawasaki, both of Japan

[73] Assignee: Fujitsu Limited, Kawasaki, Japan

[21] Appl. No.: 479,968

[22] Filed: Feb. 14, 1990

[30] Foreign Application Priority Data

Feb. 20, 1989 [JP] Japan .................................. 1-41226

[51] Int. Cl.$^5$ .......................................... G06F 13/00
[52] U.S. Cl. ................................. 395/425; 360/77.04
[58] Field of Search ... 364/200 MS File, 900 MS File; 360/77.04

[56] References Cited

U.S. PATENT DOCUMENTS 4,136,365  7/1977  Chick et al. .
4,144,583  3/1979  Lawson et al. ...................... 364/900

FOREIGN PATENT DOCUMENTS 62-222465  9/1987  Japan .

Primary Examiner—Aristotelis Psitos
Assistant Examiner—David L. Robertson
Attorney, Agent, or Firm—Staas & Halsey

[57] ABSTRACT

A head exchange system for a disc drive system for controlling the position of a head so as to cancel, during a head exchange, the previously measured offset value between the head and a track of a recording disc. The head exchange system has a head exchanger for selecting one of a plurality of heads in response to a signal from the host controller for storage of the information to the selected track of the disc. The head exchange system also has a busy signal transmitting unit for transmitting, when changing the selected head, a busy signal to the host controller for a predetermined time when a difference between the offset value for a current selected head and the offset value for a next selected head is bigger than a predetermined value. The busy signal transmitting unit has a busy table for storing a plurality of flag information between each head and the other heads and transmits a busy signal to the host controller when the difference between the offset value for the current selected head and the offset value for the next selected head is bigger than the predetermined value.

15 Claims, 8 Drawing Sheets

FIG. 9A

```
    INSTRUCTION
    WAITING ROUTINE
         │
         ▼
      ╱─S1─╲
     ╱ HEAD  ╲  YES
    ╱EXCHANGE╲────────┐
    ╲    ?   ╱         │
     ╲      ╱          ▼
      ╲NO ╱         ┌────────┐ S2
        │           │READING OF│
        │           │BUSY TABLE│
        │           └────┬────┘
        │                ▼
        │           ┌────────┐ S3
        │           │ SET OF │
        │           │  BUSY  │
        │           └────┬───┘
        │                ▼
        │           ┌────────┐ S4
        │           │UPDATE OF│
        │           │ OFFSET │
        │           │ VALUE  │
        │           └────┬───┘
        │                ▼
        │             ╱─S5─╲
        │        ┌──╲ TIME ╱
        │        │NO ╲OUT?╱
        │        └───→╲  ╱
        │              ▼ YES
        │           ┌────────┐ S6
        │           │RESET OF│
        │           │  BUSY  │
        │           └────┬───┘
        └────────────────┘
```

FIG. 9B

POST-EXCHANGE HEAD NUMBER

| PRE-EXCHANGE HEAD NUMBER | 0 | 1 | 2 | 3 | 4 | 5 | 6 | ... |
|---|---|---|---|---|---|---|---|---|
| 0 | ╲ | 2 | 1 | 2 | 3 | 4 | 5 | |
| 1 | 2 | ╲ | 1 | 2 | 2 | 3 | 4 | |
| 2 | 1 | 2 | ╲ | 1 | 2 | 3 | 4 | |
| 3 | 2 | 2 | 1 | ╲ | 1 | 2 | 3 | |
| 4 | 3 | 2 | 2 | 1 | ╲ | 1 | 2 | |
| 5 | 4 | 3 | 3 | 2 | 1 | ╲ | 1 | |
| 6 | 5 | 4 | 4 | 3 | 2 | 1 | ╲ | |
| ⋮ | | | | | | | | |

~20a

HEAD EXCHANGE SYSTEM FOR DISC DRIVE SYSTEM CONTROLLING BUSY SIGNALS IN ACCORDANCE WITH HEAD OFFSET

BACKGROUND OF THE INVENTION

This invention relates to a head exchange system for a disc drive system for controlling the position of a head so as to cancel, during head exchange, a previously measured offset value between the head and a track of a recording disc.

In the exchange of the head due to read access or write access of the disc drive system, the offset value is different for each head. Therefore, the offset value is previously measured for each head using a data-surface-servo system, and measurement for off track is taken to control the position of the head in order to cancel, during head exchange, the offset value between the head and the track of the recording disc.

Examples of prior art offset correction systems are disclosed in Japanese Unexamined Patent Publication (Kokai) No. 62-222465 and U.S. Pat. No. 4,136,365. In such prior art offset correction systems, the offset value of the head is first measured using a data-surface-servo system as described therein.

Measurement of the offset value is automatically carried out in a certain time interval. A memory device, such as a RAM of a MPU, of the disc controller maintains an offset value of each head measured until the next automatic adjustment.

Namely, the method steps are as follows: moving the head to the servo track of the data surface by a head positioning servo circuit, then reading servo data from the servo track by the head, then measuring the offset value from the servo data by controlling a microprogram of the MPU, and then storing the offset value of each head to the memory device, such as the RAM of the MPU, of the disc controller by controlling the microprogram of the MPU.

In an ordinary write or read operation, the offset value is applied from the memory of the MPU to a circuit receiving a position signal from a position encoder of a head access motor of a disc drive mechanism so that the measured offset value of the selected head is cancelled. The circuit for the position signal having completed the offset correction causes a control current to flow through a motor coil of the head access motor of the disc drive mechanism through a power amplifier to move the head, for which the offset value has been cancelled, to the on-track position.

Since physical or actual time is necessary to realize head movement for cancelling the offset value, a busy signal is transmitted to the host controller for a constant time in accordance with the head moving time for the expected maximum offset value, the read or write access is set to the waiting condition until the end of the head movement, and thereafter the read or write operation is started by resetting the busy signal upon completion of the head movement.

In the prior art head exchange systems using such offset value cancellation, the busy signal must be transmitted to the host controller to set it to the waiting condition until the end of the head movement or offset value cancellation. Such a waiting time creates a problem in that the processing ability of the disc drive system is lowered and high performance of the system is adversely affected.

SUMMARY OF THE INVENTION

Accordingly, it is an object of the present invention to provide a head exchange system for a disc drive system having improved high performance and high processing ability.

It is a further object of the present invention to provide a head exchange system for a disc drive system which minimizes the writing time due to the head movement for the offset value cancellation.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the claims.

To achieve the foregoing objects and in accordance with the purpose of the invention, as embodied and broadly described herein, there is provided a disc drive system for the type which is controlled by a host controller and using a disc having a plurality of tracks for storage of information from the host controller and a plurality of heads movable over the disc for storage of the information on the tracks of the discs, the disc drive system comprising: (1) selecting means, operatively connectable to the host controller and the plurality of heads, for selecting one of the plurality of heads in response to a signal from the host controller for storage of the information to a selected track of the disc; (2) storing means, operatively connected to the selecting means, for storing a plurality of offset values corresponding to an offset between each head and a positionally corresponding track, thereby maintain tracking of the head on the positionally corresponding track; and (3) transmitting means for transmitting, when changing the selected head, a busy signal to the host controller for a time based on a difference between the offset value for a current selected head and the offset value for a next selected head.

In a preferred embodiment, the transmitting means has a difference table for storing a plurality of difference values, each of the difference value corresponding to a difference between the offset value for each head and the offset value for each of the other heads.

In yet another embodiment, there is provided a method for operating the disc drive system as described above.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A is a flow chart illustrating another embodiment of a head exchange method according to the present invention;

FIG. 9B is a chart illustrating another embodiment of a busy table of the disc drive system according to the present invention using the head exchange method of FIG. 9A.

DETAILED DESCRIPTION OF THE PREFERRED EMBODIMENTS

Reference will now be made in detail to the present preferred embodiments of the invention, examples of which are illustrated in the accompanying drawings.

Figure 1A:
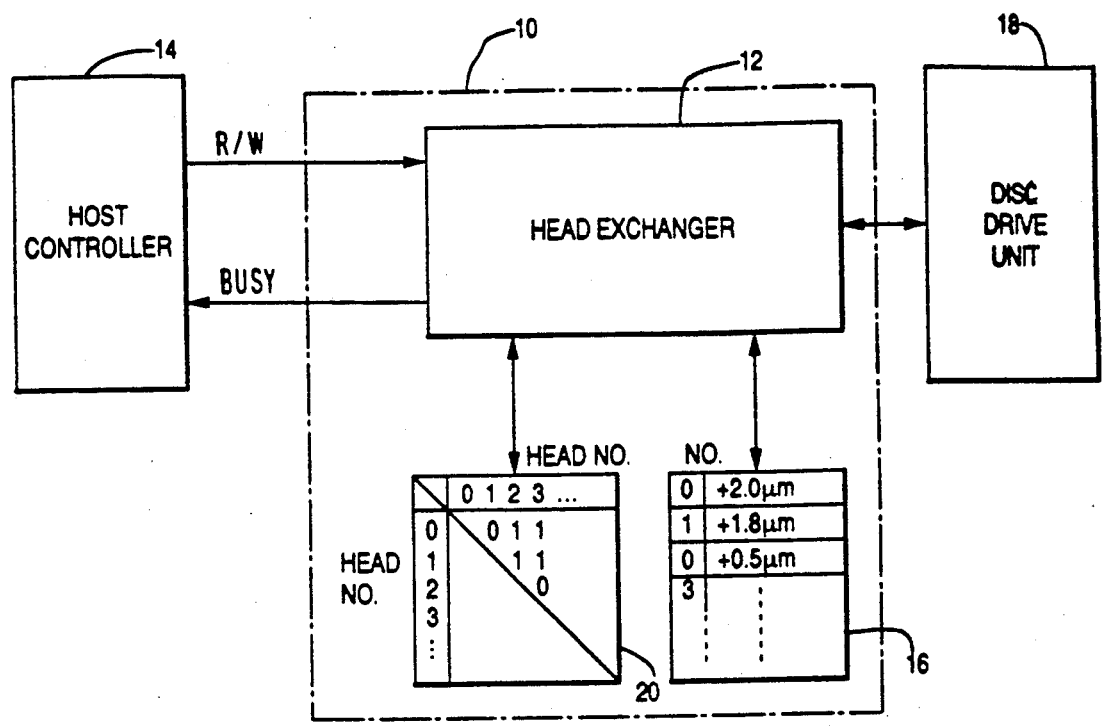
FIG. 1A is a block diagram illustrating a disc drive system according to the present invention.

FIG. 1A is a block diagram illustrating a disc drive system according to the present invention. A host controller 14 is an information processor, for example a personal computer. A disc drive unit 18 is a disc drive mechanism at least including an information storage disc and a plurality of read and/or write heads. Element 10 of the disc drive system is a disc unit controller for the disc drive unit 18 which is responsive to the host controller 14. Disc unit controller 10 includes a MPU and a RAM, and a head exchanger 12 for selecting one of the plurality of heads of disc drive unit 18. An offset value storing table 16 is also provided for storing a plurality of offset values corresponding to an offset between each head and a positionally corresponding track, to hereby maintain tracking of the head on the positionally corresponding track. The head exchange system of the disc drive system controls the position of the head of the disc unit 18 so that the offset value previously measured and stored in the offset value storing table 16 is cancelled when a head exchange is performed, via head exchanger 12 from host controller 14, of a read or write access signal ("R/W"). A busy table 20 is provided as part of the head exchange system and is operatively connected to the head exchanger 12. In the busy table 20, busy flags are stored with a pre-exchange head number (current selected head number) and a post-exchange head number (next selected head number) used as indication parameters. Namely, the busy flag is set when a change of offset during head exchange is large or reset when it is small.

At the time of head exchange, the busy table 20 is searched for the pre-exchange head and the post-exchange head numbers. When a busy flag is set (=1), the busy signal is transmitted to the host controller 14 for a certain constant period or until the head movement is completed to establish the waiting condition. When the busy flag is reset (=0), the read or write access starts immediately without transmitting the busy signal to the host controller 14.

Figure 1B:
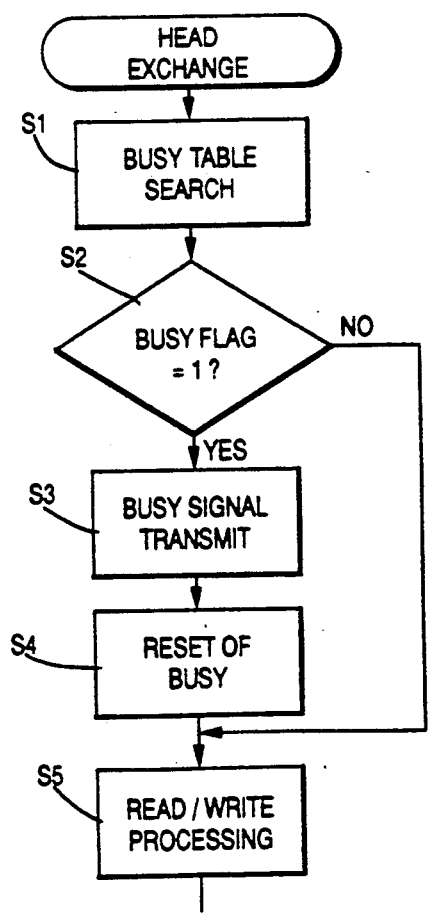
FIG. 1B is a flow chart illustrating operation of a disc controller according to the present invention.

FIG. 1B is a flow chart illustrating operation of the disc unit controller 10 of the disc drive system according to the present invention. When the host controller 14 sends an instruction for a head exchange to the disc unit controller 10, a microprogram in the disc unit controller 10 starts the operation. At the time of head exchange and as step S1, the disc unit controller 10 searches the busy table 20 for the pre-exchange head and the post-exchange head numbers. Then as step S2, the disc unit controller 10 decides whether the busy flag is set or reset. When the busy flag is set (=1), the busy signal is transmitted to the host controller 14 for a certain constant period or until the head movement is completed to establish the waiting condition in step S3. When the time period ends, the busy signal stops transmitting to the host controller 14 and in step S4 the busy flag is reset. After reset, in step S5 the read or write access starts. When the busy flag is reset (=0), the read or write access starts immediately without transmitting a busy signal to the host controller 14 in step S3.

In the above head exchange system for a disc system, R/W access from the host controller 14 is set to a waiting condition due to the transmission of a busy signal only when a change of the offset value during the head exchange is large. When a change of the offset value during the head exchange is small, R/W access can be started immediately. Thereby, according to the invention, the processing ability per unit time can be improved in comparison with that of the prior art, wherein R/W access is set to a waiting time under all conditions during head exchange.

Figure 2:
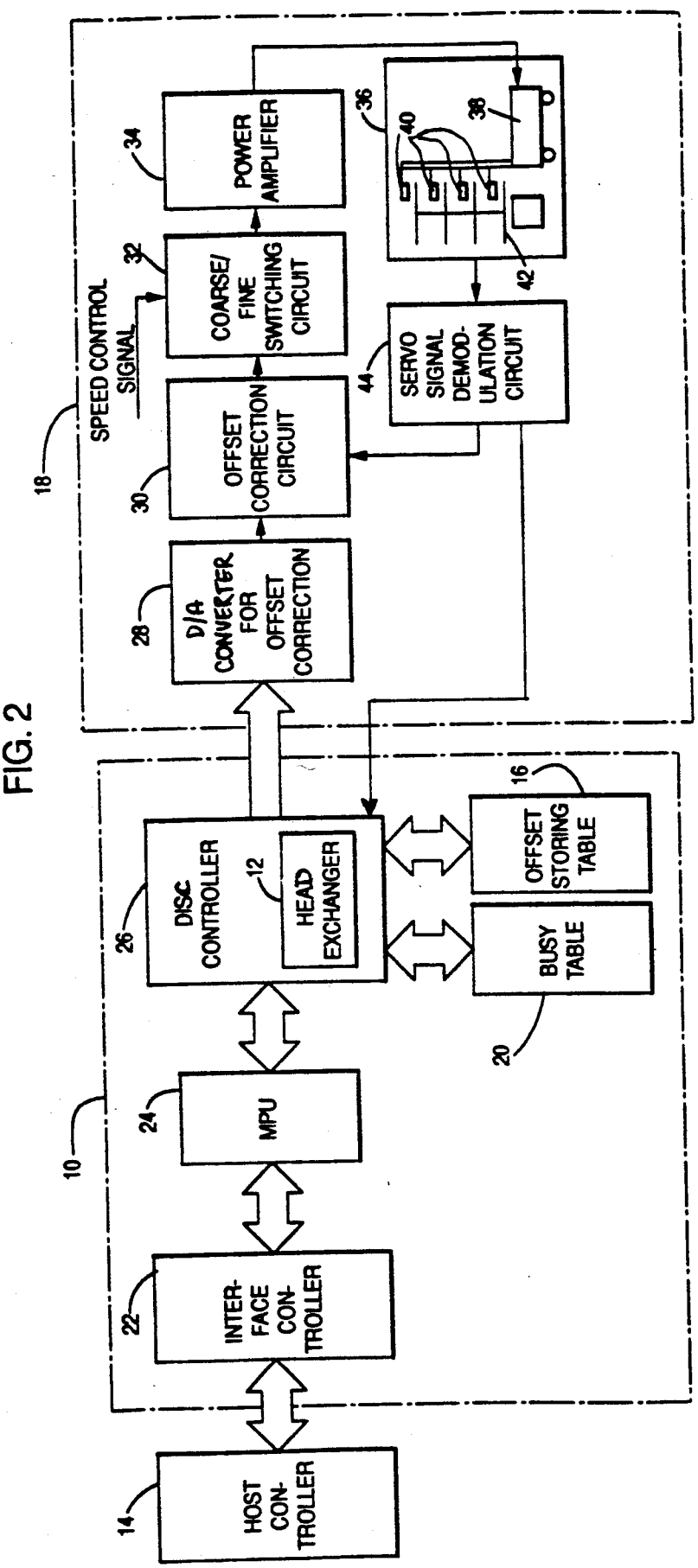
FIG. 2 is a block diagram illustrating an embodiment of a disc drive system according to the present invention.

FIG. 2 is a block diagram illustrating an embodiment of a disc drive system according to the present invention. In FIG. 2, the disc unit controller 10 comprises an interface controller 22, operatively connected to host controller 14, for receiving an instruction signal from the host controller 14, for transferring a response signal, including a busy signal based on the control side of disc drive controller 10, and for transferring read data or write data between the host controller 14 and the disc drive unit 18.

A MPU 24 is also provided connected to and following the interface controller 22 in order to execute therein various method steps required for disc control by analyzing instructions from the host controller 14. A disc controller 26 is provided connected to and following MPU 24. Disc controller 26 comprises hardware for the head exchanger 12. The offset storing table 16 is connected to this disc controller 26. The offsets measured for each head using a data-surface-servo system in the disc drive unit 18 are stored in the offset storing table 16. Measurement of offset to be stored in the offset storing table 16 is carried out with a constant time interval under the control of a microprogram of MPU 24 and offset is held in the offset storing table 16 until the next automatic adjustment.

A busy table 20 is connected to the disc controller 26 and busy flags based on previously measured offsets of each head are stored in the busy table 20. Namely, flag information is stored in this busy table 20 indicating that when a change of offset value during head exchange between a plurality of heads is large, the busy flag is set (=1) and when a change of offset value is small, the busy flag is reset (=0).

The MPU 24 searches the busy table 20 based on the pre-exchange head number and post-exchange head number and reads the corresponding busy flag when the head select is instructed during the read access or write access processing from the host controller 14. The disc controller 26 and MPU 24 transmit the busy signal, when the busy flag is set, to the host controller 14 through the interface controller 22 for a constant period or until the end of head movement for offset cancellation and sets the disc unit controller of the disc drive system 10 to a waiting condition for R/W access from the host controller 14. However, when the busy flag is reset, the busy signal for the host controller 14 is not transmitted by disc controller 26 and MPU 24. Instead, processing by the disc unit controller 10 of the disc drive system based on R/W access of the host controller 14 is immediately started.

The processing during head selection using the busy table 20 will be further explained below.

The disc drive unit 18 is provided with a D/A converter 28 for offset correction. The offset data for cancelling the offset value corresponding to the head number to be selected, which is stored in the offset storing table 16, is provided to the D/A converter 28 by the disc controller 26 during head selection. D/A converter 28 converts the digital offset data to an analog signal. The offset signal from the D/A converter 28 for offset correction in turn is applied to an offset correction circuit 30. Added to the offset signal in circuit 30 is a position signal from a position encoder of motor 38 through a servo signal demodulation circuit 44. Circuit 30 thus generates a final position signal having completed the offset correction. The final position signal from the offset correction circuit 30 is applied to a coarse/fine switching circuit 32. Since the coarse/fine switching signal is switched to the fine side during the head selection, the position signal from the offset correction circuit 30 is selected and is then applied to a power amplifier 34 connected to the output of circuit 30. Of course, in the seek operation for moving the head to the target track position by receiving access from the host controller 14, the coarse/fine switching circuit (not shown) is switched to the coarse side. In this operation, the speed control signal of the speed control circuit (not shown) is supplied to the power amplifier 34 through the coarse/fine switching circuit 32 to execute the speed control for moving the head to the target track position.

Output of power amplifier 34 is supplied to a disc drive mechanism 36 via a voice coil motor 38. Motor 38 controls the position of a plurality of heads 40 connected to the voice coil motor 38 for the magnetic disc 42 so as to cancel the offset value of the selected head.

When measuring the offset value, the servo signals obtained from the heads 40 of the disc drive mechanism 36 are applied to the servo signal demodulation circuit 44 and then converted therein to the offset value of each head to be applied to the disc controller 26.

Figure 3:
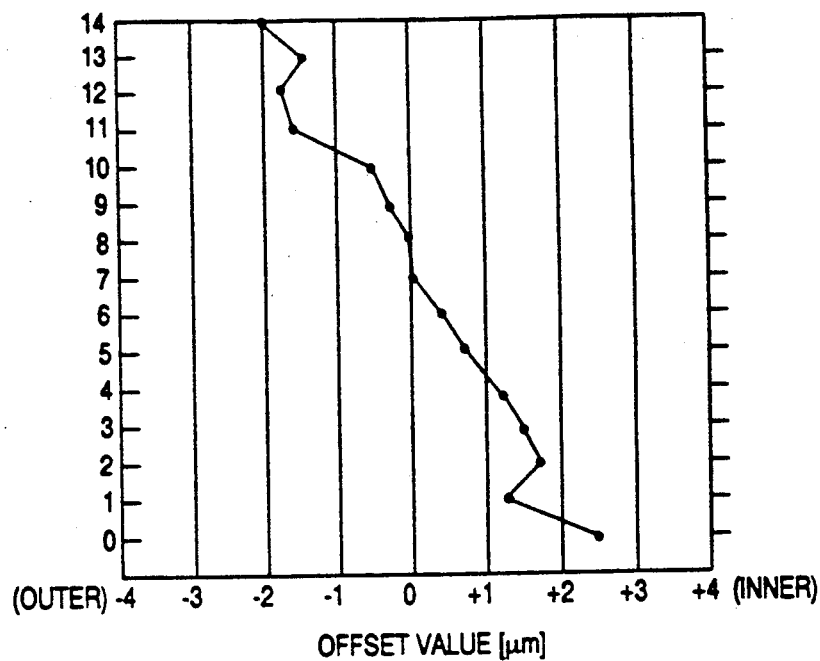
FIG. 3 is a graph illustrating the results of offset value measurements of a disc drive system according to the present invention.

FIG. 3 is a graph illustrating a result of offset value measurement for each head to be stored in the offset storing table 16 and then provided to the disc controller 26 of FIG. 2.

In FIG. 3, the offset value is measured for each head using the data-surface-servo system (for example, a system as disclosed in Japanese Unexamined Patent Publication (Kokai) No. 62-222465) for the heads of number "0" to number "14". As an example, the offset values toward the outer side are indicated by a minus sign and become larger for the heads of a larger number. The offset values toward the inner side are indicated by a plus sign and become larger for the heads of a smaller number. The offset values based on the offset measuring results shown in FIG. 3 are stored in the offset value storing table 16 of FIG. 2 with the head number used as the indication parameter.

Figure 4:
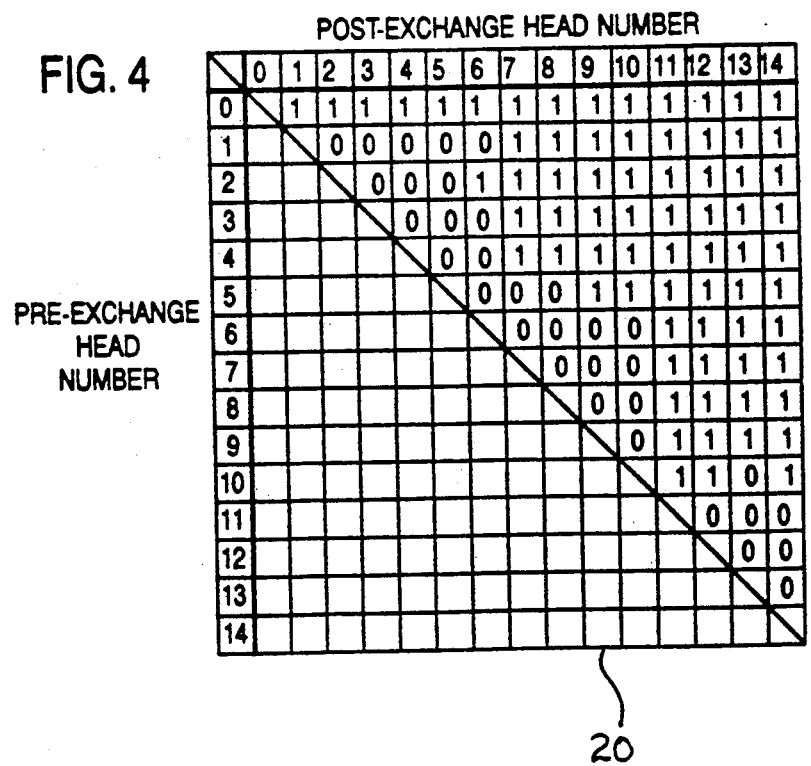
FIG. 4 is a chart illustrating an embodiment of a busy table for the disc drive system according to the present invention.

FIG. 4 is a chart illustrating an embodiment of the busy table 20 for the disc controller 26 of FIG. 2. As an example, busy table 20 indicates the contents of a table generated based on the offset measuring results shown in FIG. 3.

In FIG. 4, the vertical axis of busy table 20 indicates the pre-exchange head number. The busy flag of "0" or "1" is stored in the right upper half position where the pre-exchange and post-exchange head numbers cross.

The busy flag is determined as follows. When change of offset or offset variation between the pre-exchange head number and post-exchange head number is large, the busy flag is set to "1". When change of offset or offset variation is small, the busy flag is reset to "0". A threshold value of offset variation for setting the busy flag to "1" or resetting it to "0" may be set to a desirable value in which the head moving time for offset cancellation can substantially be neglected. For example, when the offset variation is 1 $\mu$m or more, the busy flag is set to "1". When offset variation is smaller than 1 $\mu$m, the busy flag is reset to "0".

Figure 5:
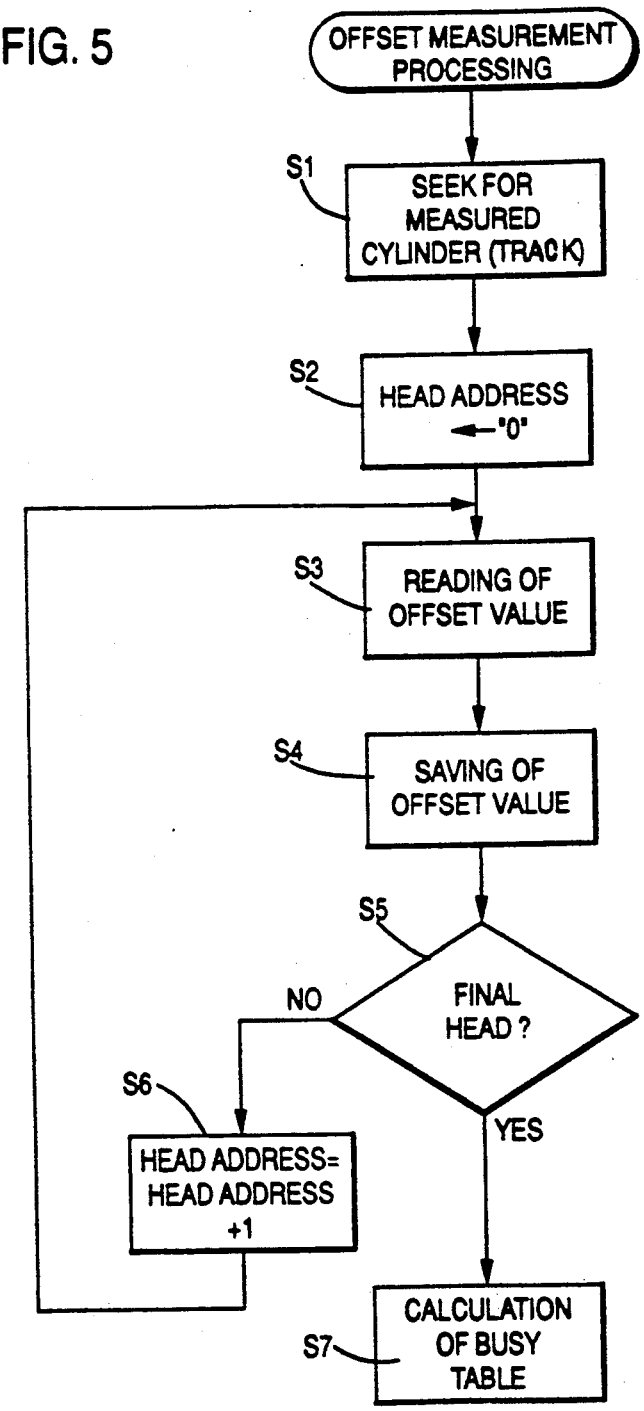
FIG. 5 is a flow chart illustrating an embodiment of an offset value measurement method according to the present invention.

FIG. 5 is a flow chart illustrating an offset measuring operation or method of the MPU 24 shown in FIG. 2 for measuring offset of each head and for establishing the offset storing table 16. The offset measuring process is performed by a microprogram of MPU 24 and is automatically carried out with a constant time interval (actually at a timing of seek instruction appearing after a constant time) using the data-surface-servo system of disc drive unit 18. The measured offset values are sorted in the offset storing table 16 based on the result of offset measurement and the calculated busy flag is stored in the busy table 20.

As illustrated in FIG. 5, when the offset measuring process is started in step S1, the seek operation is first carried out for measuring the track. In step S2, the head address is set to the initial address "0". In step S3, an offset value is read using the data-surface-servo system of drive unit 18. In step S4, an offset value is saved to the offset storing table 16. Thereafter in step S5, it is checked whether the head is the final head or not. When the head is not the final head, the head address is incremented by "+1" in step S6, and reading of the offset in step S3 and saving of offset in step S4 are repeated again.

When the head is decided to be the final head in step S5, a busy list is generated by calculating busy flags shown in FIG. 4 based on the measured offset values saved in the offset storing table 16 in step S7. This busy list is stored in the busy table 20, thereby completing the series of process steps.

Figure 6:
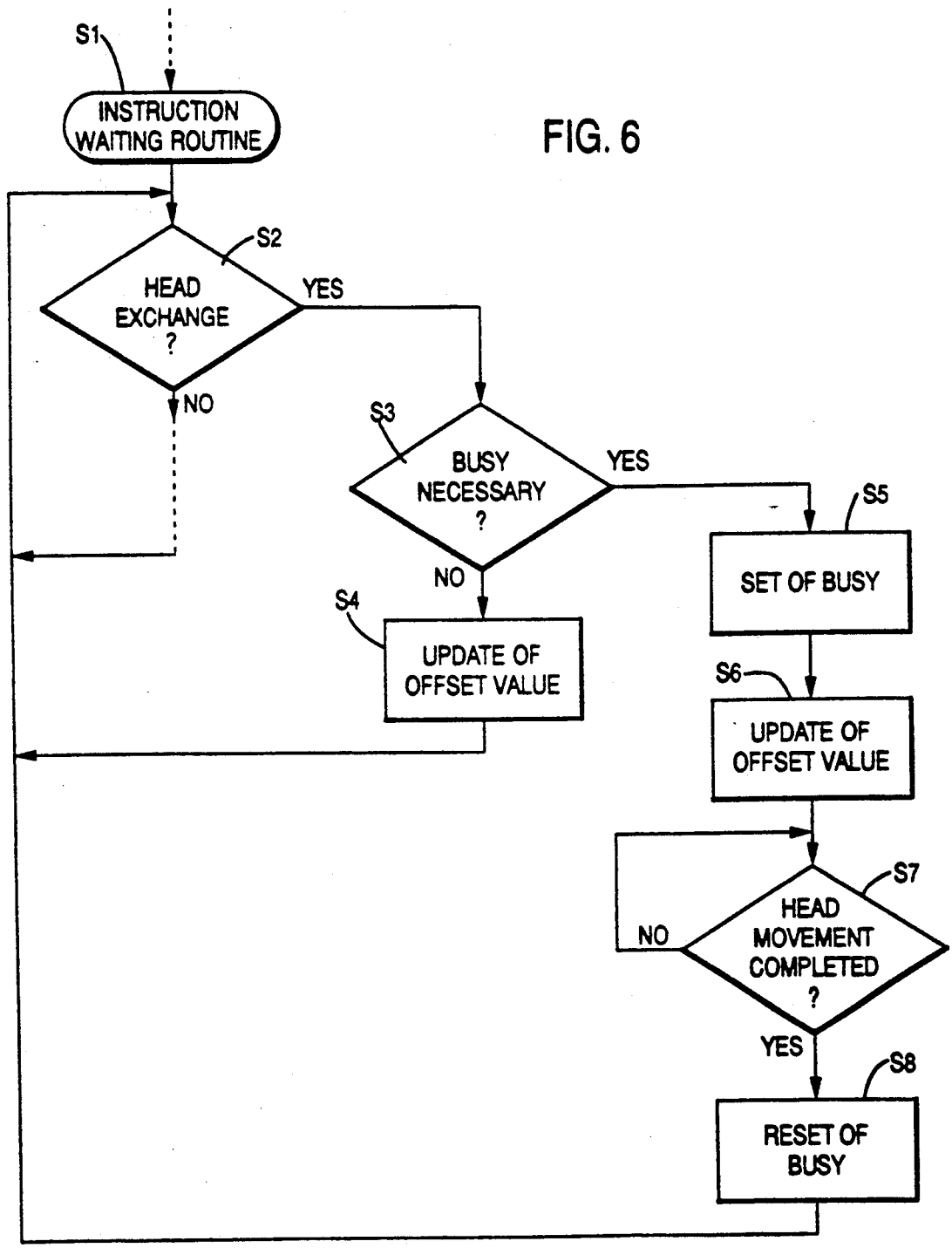
FIG. 6 is a flow chart illustrating an embodiment of a head exchange method according to the present invention.

FIG. 6 is a flow chart illustrating the operation or method for head exchange in accordance with the present invention.

In FIG. 6, when the read access or write access is received by MPU 24 from the host controller 14 in a step S1, i.e., an instruction waiting routine, the necessity of head exchange is checked as step S2. When head exchange is decided in step S2, it is necessary as step S3 to determine whether the busy signal must be transmitted or not to the host controller 14. Namely, since the pre-exchange head number (the current selected head number) and the post-exchange head number (next selected head number) can be obtained in step S2 of the head exchange process, the busy table 20 is searched in step S3 with reference to these two head numbers to read the corresponding busy flag. If the busy flag is set to "0", the measured offset value corresponding to the post-exchange head number is read from the offset sorting table 16 and the offset value for the disc drive unit 18 is updated in a step S4.

Meanwhile, if the busy flag is set to "1" requesting the necessity of a busy signal in the step S3, the busy signal is transmitted to the host controller 14, thereby setting the disc unit controller 10 to a waiting condition in a step S5. Thereafter, like the processing in step S4, an offset correction value based on the measured offset value corresponding to the post-exchange head number of offset storing table 16 is updated in a step S6. Upon update of this offset correction value, the disc drive unit 18 conducts position control for the heads to cancel the offset of the post-exchange head. Completion of head movement in the position control stage for the head for cancelling offset of the post-exchange head is always monitored in a step S7. When head movement for offset cancellation is completed, transmission of a busy signal to the host controller 14 is suspended and the read access or write access to the disc drive unit 18 is started by cancelling the busy condition of disc unit controller 10 in a step S8.

A practical control application during head exchange illustrated in the operation flow diagram of FIG. 6 is carried out by the disc drive system as explained hereunder.

Figures 7A, 7B:
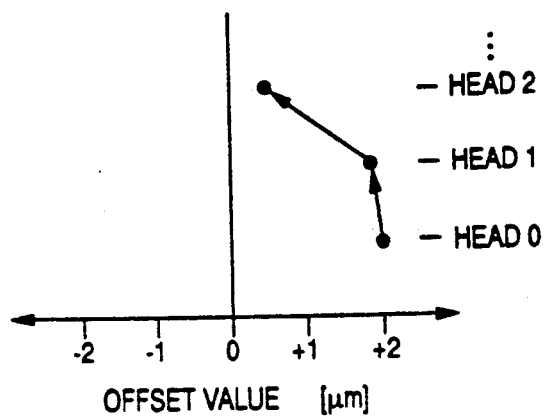
FIG. 7A is a chart illustrating offset correction of the heads using the head exchange method of FIG. 6 according to the present invention.
FIG. 7B is a chart illustrating an embodiment of a busy table for the disc drive system according to the present invention using the head exchange method of FIG. 6.

For example, when offset of head number "0" is +2 μm and offset of head number "1" is +1.8 μm as shown in FIGS. 7A and 7B, the offset correction of +2 μm is added at circuit 30 to the position signal of the position servo circuit 44 of disc drive unit 18 during the read or write operation by the head number "0". Next, when the read or write access is shifted to the head number "1" from the head number "0", the busy flag is reset to "0" since the difference of offset correction is as small as 0.2 μm. Therefore, nothing is notified to the host controller 14 and the offset correction value for the positioning servo circuit is changed to the offset value of head number "1" of +1.8 μm, holding the read or write ready condition.

Moreover, when the offset of head number "2" is +0.5 μm, offset variation from the head number "1" to head number "2" is +1.3 μm and a certain period is necessary for mechanical movement of the head. In this case, the busy flag read from the busy table 20 is set to "1" as shown in FIG. 7B. Therefore, the busy signal is provided to the host controller 14 during head movement for offset correction due to the head exchange to the head number "2". The read or write operation is inhibited during this head movement.

In the steps S7 and S8 of FIG. 6, the busy condition is cancelled after completion of head movement for offset cancellation. It is also possible to reset the busy condition after a constant period from the start of a timer.

Figure 8:
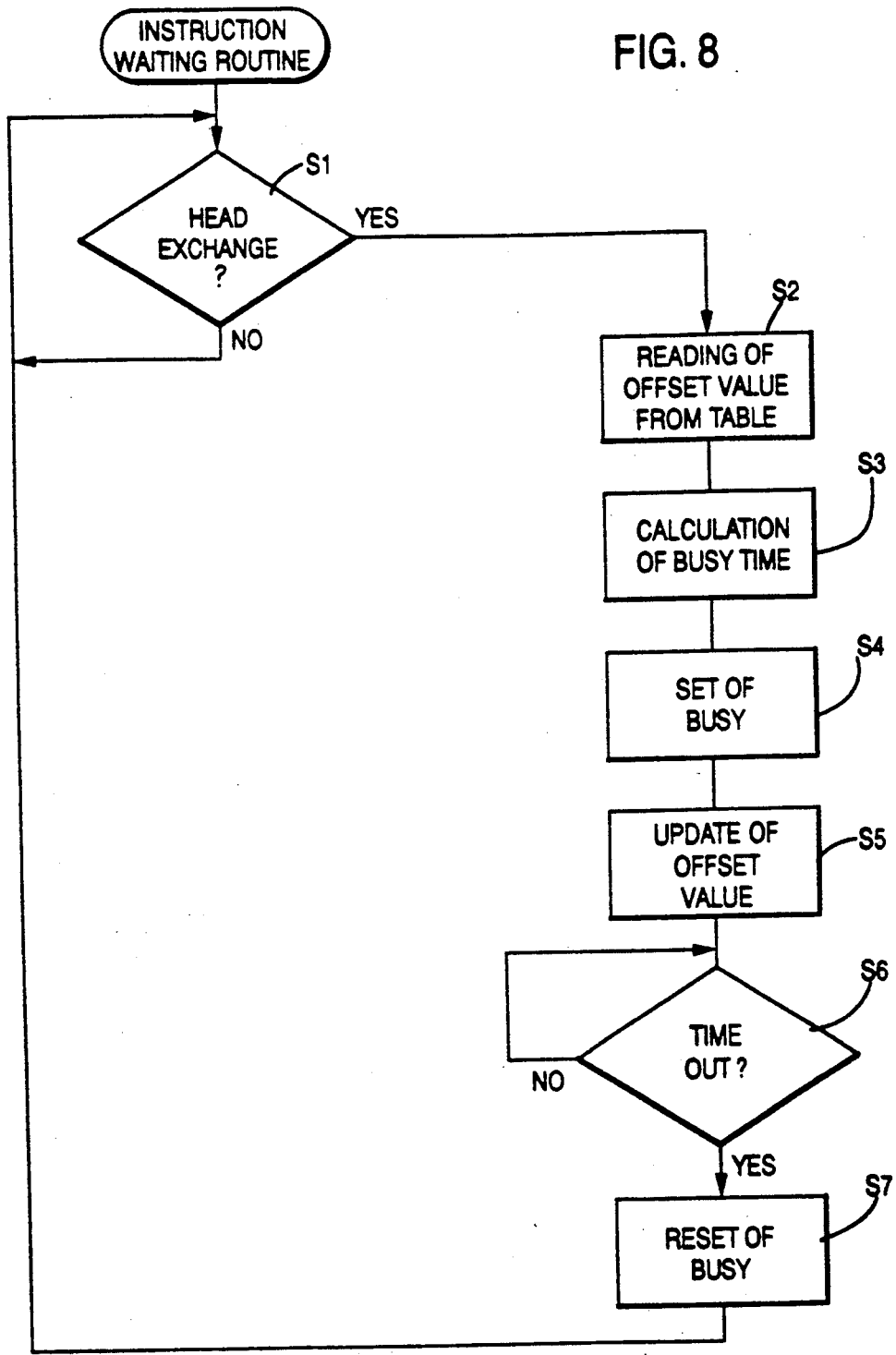
FIG. 8 is a flow chart illustrating another embodiment of a head exchange method according to the present invention.

FIG. 8 is a flow chart illustrating another embodiment of a head exchange operation or method according to the present invention.

As illustrated in FIG. 8, when the read access or write access signal is received by MPU 24 from the host controller 14 in the instruction waiting routine, the necessity of a head exchange is checked in a step S1. If head exchange is decided to be necessary in step S1, reading of an offset value of the current selected head and the next selected head from offset value storing table 16 is achieved in a step S2. From this offset value, calculation of time for completing head movement is determined in a step S3 to establish a waiting condition. Then, the busy signal is transmitted to the host controller 14, setting the disc unit controller 10 to a waiting condition in a step S4. Thereafter in a step S5, an offset correction value based on the measured offset value corresponding to the post-exchange head number of offset storing table 16 is updated. Upon update of this offset correction value, the disc drive unit 18 conducts position control for the heads to cancel the offset value of the post-exchange head. Completion of head movement in the position control stage for the head for cancelling offset of the post-exchange head is always monitored in a step S6, based on the calculated time of step S3. When head movement for offset cancellation is completed, transmission of the busy signal to the host controller 14 is suspended and the read access or write access to the disc drive unit 18 is started by cancelling the waiting condition of disc controller 10 in step S7.

In this embodiment of the head exchange process, the busy table 20 of FIG. 2 is not required. The above process includes the steps of calculating busy time and thus serves for the same function as the busy table 20 of FIG. 2. In this process, moreover, it is easier possibly to change the micro program of the MPU 24 of FIG. 2.

FIG. 9A is a flow chart illustrating yet another embodiment of a head exchange operation or method according to the present invention.

As illustrated in FIG. 9A, when the read access or write access signal is received by MPU 24 from the host controller 14 in the instruction waiting routine, the necessity of a head exchange is checked in a step S1. If head exchange is decided to be necessary in the step S1, reading of a busy table will be conducted in a step S2 as will be further explained later by reference to FIG. 9B. A busy table 20a is rearranged to that of the busy table 20 of FIG. 2. Then in a step S3, the busy signal is transmitted to the host controller 14, setting the disc unit controller 10 to a waiting condition. Thereafter in a step S4, an offset correction value based on the measured offset value corresponding to the post-exchange head number of offset storing table 16 is updated. Upon update of this offset correction value, the disc drive unit 18 conducts position control for the heads to cancel the offset value of the post-exchange head. Completion of head movement in the position control stage for the head for cancelling offset of the post-exchange head is always monitored in a step S5, based on the time of reading the busy table in step S2. When head movement for offset cancellation is completed, transmission of the busy signal to the host controller 14 is suspended and the read access or write access to the disc drive unit 18 is started by cancelling the waiting condition of disc controller 10 in a step S6.

In this embodiment of the head exchange method, it is also possible to easily change the microprogram of the MPU 24 of FIG. 2.

FIG. 9B is a chart illustrating an embodiment of a busy table of the disc drive system according to the invention using the head exchange method of FIG. 9A.

In FIG. 9B, the vertical axis of busy table 20a indicates the pre-exchange head number, while the horizontal axis indicates the post-exchange head number. The busy time is stored in the right upper half portion where the pre-exchange and the post-exchange head numbers cross.

The busy time is determined as follows. In the offset measuring operation for measuring offset of each head as step S7 illustrated in FIG. 5, a busy time list is generated by calculating busy time based on the measured offset values saved in the offset storing table 16. This busy time list is stored in the busy table 20a shown in FIG. 9B. For example, for change of offset between the pre-exchange head number "0" and post-exchange number "1", when the time for the head movement is 2 ms, the busy time is set to "2". For change of offset between the pre-exchange head number "0" and post-exchange number "2", when the time for the head movement is 1 ms, the busy time is set to "1". In this busy table, it is possible to easily change the microprogram of the MPU 24 of FIG. 2, especially changing step S7 of the offset measuring operation illustrated in FIG. 5.

It is intended that the present invention cover the modifications and variations in the head exchange system for a disc drive system and the methods of operation which fall within the scope of the claims and their equivalents, and without limitation to the different environments in which to use the head exchange system and its related method of operation.

What is claimed is:

1. A disc drive system for the type which is controlled by a host controller and using a disc having a plurality of tracks for storage of information from the host controller and a plurality of heads movable over the disc for storage of the information on the tracks of the disc, the disc drive system comprising:
   (a) selecting means, operatively connectable to the host controller and the plurality of heads, for selecting one of the plurality of heads in response to a signal from the host controller for storage of information to a selected track of the disc;
   (b) storing means, operatively connected to the selecting means, for storing a plurality of offset values corresponding to an offset between each head and a positionally corresponding track, thereby maintaining tracking of the head on the positionally corresponding track; and
   (c) transmitting means for transmitting, when changing the selected head, a busy signal to the host controller for a time based on a difference between the offset value for a current selected head and the offset value for a next selected head.

2. The disc drive system of claim 1, wherein the transmitting means includes an interface controller operatively connected to the host controller for transmitting the busy signal to the host controller.

3. The disc drive system of claim 2, wherein the transmitting means includes a microprocessor unit (MPU) for processing the transmitting time of the busy signal to the host controller based on the difference between the offset value for the current selected head and the offset value for the next selected head and issuing an order for transmitting of the busy signal to the interface controller.

4. The disc drive system of claim 1, wherein the transmitting means has a busy time storing table for storing a plurality of busy time based on a plurality of difference values, each of the difference values corresponding to a difference between the offset value for each head and the offset value for each of the other heads.

5. A disc drive system for the type which is controlled by a host controller comprising:
   (a) a disc having a plurality of tracks for storage of information from the host controller;
   (b) a plurality of heads movable over the disc for the storage of the information on the tracks of the disc;
   (c) selecting means, operatively connected to the host controller and the plurality of heads, for selecting one of the plurality of heads in response to a signal from the host controller for storage of information to a selected track of the disc;
   (d) storing means, operatively connected to the selecting means, for storing a plurality of offset values corresponding to an offset between each head and a positionally corresponding track, thereby maintaining tracking of the head on the positionally corresponding track; and
   (e) transmitting means for transmitting, when changing the selected head, a busy signal to the host controller during a busy time, and the transmitting means including a busy time storing table for storing a plurality of busy time based on a plurality of difference values, each of the difference values corresponding to a difference between the offset value for each head and the offset value for each of the other heads.

6. The disc drive system of claim 5, wherein the transmitting means includes an interface controller operatively connected to the host controller for transmitting the busy signal to the host controller.

7. The disc drive system of claim 6, wherein the transmitting means includes a microprocessor unit (MPU) for processing the transmitting time of the busy signal to the host controller using the busy time storing table based on the current selected head and the next selected head.

8. A disc drive system for the type which is controlled by a host controller and using a disc having a plurality of tracks for storage of information from the host controller and a plurality of heads movable over the disc for the storage of the information on the tracks of the disc, the disc drive system comprising:
   (a) selecting means, operatively connectable to the host controller and the plurality of heads, for selecting one of the plurality of heads in response to signal from the host controller for storage of the information to a selected track of the disc;
   (b) storing means, operatively connected to the selecting means, for storing a plurality of offset values corresponding to an offset between each head and a positionally corresponding track, thereby maintaining tracking of the head on the positionally corresponding track; and
   (c) transmitting means for transmitting, when changing the selected head, a busy signal to the host controller for a predetermined time when a difference between the offset value for a current selected head and the offset value for a next selected head is larger than a predetermined value.

9. The disc drive system of claim 8, wherein the transmitting means has a busy table for storing a plurality of flag information between each head and the other heads and transmits a busy signal to the host controller when the difference between the offset value for the current selected head and the offset value for the next selected head is larger than a predetermined value.

10. The disc drive system as claimed in claim 9, wherein the busy table has a set flag and a reset flag for the flag information, the flag being a set flag when the difference between the offset value for the current selected head and the offset value for the next selected head change is larger than the predetermined value and the flag being a reset flag when the difference is smaller than the predetermined value.

11. The disc drive system of claim 8, wherein the transmitting means includes an interface controller operatively connected to the host controller for transmitting the busy signal to the host controller.

12. The disc drive system of claim 9, 10 or 11, wherein the transmitting means includes a microprocessor unit (MPU) for processing the transmitting time of the busy signal to the host controller based on the flag of the busy table.

13. A method for a head exchange system of a disc drive system having a plurality of heads movable over a disc for the storage of information on a track of the disc and a head exchanger for selecting one of the plurality of heads in response to a signal from a host controller for storage of information to the selected track of the disc, the method comprising the steps of:
(a) measuring a plurality of offset values corresponding to an offset between each head and a positionally corresponding track;
(b) storing the plurality of offset values to an offset storing table;
(c) measuring a plurality of difference values, each of the difference values corresponding to a difference between the offset value for each head and the offset value for each of the other heads;
(d) storing a plurality of set and reset flags for a flag information, the flag being set when the difference value is larger than a predetermined value and the flag being reset when the difference value is smaller than the predetermined value; and
(e) transmitting a busy signal to the host controller during the head exchange when the flag information between the current selected head and the next selected head is set.

14. A method for a head exchange system of a disc drive system having a plurality of heads movable over a disc for the storage of information on a track of the disc and a head exchanger for selecting one of the plurality of heads in response to a signal from a host controller for storage of information to the selected track of the disc, the method comprising the steps of:
(a) measuring a plurality of offset values corresponding to an offset between each head and a positionally corresponding track;
(b) storing the plurality of offset values to an offset storing table;
(c) measuring a busy time for completion of head movement and establishing a waiting condition based on a plurality of difference values, each of the difference values corresponding to a difference between the offset value for each head and the offset value for each of the other heads;
(d) storing the plurality of busy times to a busy table;
(e) selecting a busy time from the busy table based on a current selected head and next selected head; and
(f) when head exchange is to occur, transmitting a busy signal to the host controller for the selected busy time of the busy table.

15. A method for a head exchange system of a disc drive system having a plurality of heads movable over a disc for the storage of information on a track of the disc and a head exchanger for selecting one of the plurality of heads in response to a signal from a host controller for storage of information to the selected track of the disc, the method comprising the steps of:
(a) measuring a plurality of offset values corresponding to an offset between each head and a positionally corresponding track;
(b) storing the plurality of offset values to an offset storing table;
(c) measuring a busy time for completion of head movement and establishing a waiting condition based on a plurality of difference values, each of the difference values corresponding to a difference between the offset value for each head and the offset value for each of the other heads; and
(d) when the head exchange is to occur, transmitting a busy signal to the host controller for measured busy time corresponding to a current selected head and next selected head.

* * * * *

UNITED STATES PATENT AND TRADEMARK OFFICE
CERTIFICATE OF CORRECTION

PATENT NO.  : 5,109,502
DATED       : April 28, 1992
INVENTOR(S) : TATSURO SASAMOTO etal It is certified that error appears in the above-identified patent and that said Letters Patent is hereby corrected as shown below:

Column 2, line 34, "maintain" s/b --maintaining --;
         line 43, "value" s/b --values --.

Column 3, line 49, after "exchange" insert --system --;

Column 3, line 49-50, "performed" s/b --notified --.

Column 8, line 24, delete "for";
         line 25-26, " easier to possibly change" s/b --possible to easily change --.

Column 10, line 18 (claim 5), "time" s/b --times --.
          line 41 (claim 8), after "to" insert --a--.

Signed and Sealed this

Seventh Day of December, 1993

Attest:

BRUCE LEHMAN

Attesting Officer

Commissioner of Patents and Trademarks